(12) United States Patent
Fukushima et al.

(10) Patent No.: US 7,811,706 B2
(45) Date of Patent: Oct. 12, 2010

(54) BATTERY

(75) Inventors: Yuzuru Fukushima, Miyagi (JP); Shinji Hatake, Fukushima (JP); Fumiko Hashimoto, Fukushima (JP); Satoshi Mizutani, Fukushima (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 1178 days.

(21) Appl. No.: 11/268,336

(22) Filed: Nov. 7, 2005

(65) Prior Publication Data

US 2006/0099511 A1     May 11, 2006

(30) Foreign Application Priority Data

Nov. 8, 2004    (JP)    ............ P2004-324400

(51) Int. Cl.
*H01M 4/58*    (2010.01)

(52) U.S. Cl. ............ 429/231.8; 429/218.1; 429/209; 252/182.1

(58) Field of Classification Search ........ None
See application file for complete search history.

(56) References Cited

U.S. PATENT DOCUMENTS

| | | | | |
|---|---|---|---|---|
| 5,744,264 | A * | 4/1998 | Barker | 429/223 |
| 7,132,197 | B2 * | 11/2006 | Miyaki | 429/218.1 |
| 2005/0164081 | A1 * | 7/2005 | Ogura et al. | 429/185 |
| 2006/0029865 | A1 * | 2/2006 | Morishima et al. | 429/231.95 |

FOREIGN PATENT DOCUMENTS

| | | |
|---|---|---|
| JP | 60086759 | 5/1985 |
| JP | 61066369 | 4/1986 |
| JP | 62145650 | 6/1987 |
| JP | 07-263028 | 10/1995 |
| JP | 7302588 | 11/1995 |
| JP | 7326342 | 12/1995 |
| JP | 09-266011 | 7/1997 |
| JP | 10125317 | 5/1998 |
| JP | 10199524 | 7/1998 |
| JP | 10223221 | 8/1998 |
| JP | 10255768 | 9/1998 |
| JP | 10302770 | 11/1998 |
| JP | 10308207 | 11/1998 |
| JP | 11086854 | 3/1999 |
| JP | 2002-110250 | 12/2002 |
| JP | 2003-303585 | 10/2003 |
| JP | 2004-186035 | 2/2004 |
| WO | WO 00/17948 | * 3/2000 |

* cited by examiner

*Primary Examiner*—Dah-Wei Yuan
*Assistant Examiner*—Cynthia Lee
(74) *Attorney, Agent, or Firm*—K&L Gates LLP

(57) ABSTRACT

A battery capable of improving the energy density and cycle characteristics is provided. A cathode active material layer contains a complex oxide containing Li and Co as a cathode active material. An anode active material layer contains a CoSnC containing material containing Sn, Co, and C as an element, in which the content of C is from 16.8 wt % to 24.8 wt %, and the ratio of Co to the total of Sn and Co is from 30 wt % to 45 wt % as an anode active material. The surface density ratio of the cathode active material layer to the anode active material layer (surface density of the cathode active material layer/surface density of the anode active material layer) is from 2.77 to 3.90.

4 Claims, 3 Drawing Sheets

BATTERY

CROSS REFERENCES TO RELATED APPLICATIONS

The present invention claims priority to Japanese Patent Application JP 2004-324400 filed in the Japanese Patent Office on Nov. 8, 2004, the entire contents of which being incorporated herein by reference.

BACKGROUND

The present invention relates to a battery using an anode active material containing tin (Sn), cobalt (Co), and carbon (C) as an element.

In recent years, many portable electronic devices such as a combination camera (Videotape Recorder), a mobile phone, and a notebook personal computer have been introduced. As downsizing and weight saving of such devices have been made, improving energy density of the battery used as a portable power source for such electronic devices, particularly of the secondary battery has been strongly demanded.

As a secondary battery to meet such a demand, so-called lithium ion secondary batteries using a graphite material utilizing intercalation reaction of lithium ions, or using a carbon material applying insertion and extraction action of lithium ions to and from the fine pores for the anode active material have been traditionally in practical use.

However, in recent years, as technical advancement of portable equipment has been made, demand for capacities of secondary batteries has become stronger. As a secondary battery to meet such a demand, it has been suggested that a light metal such as a lithium metal is used as it is as an anode active material. In such a battery, in the process of charging, the light metal is easily dendrite-precipitated on the anode, and the current density becomes very high at the end of the dendrite. Therefore, there have been disadvantages that the cycle life is deteriorated due to decomposition of the non-aqueous electrolytic solution or the like, or dendrite is excessively grown to cause internal short circuit of the battery.

Meanwhile, using various alloy materials or the like as an anode active material has been suggested. For example, in Japanese Unexamined Patent Application Publication Nos. H07-302588, H10-199524, H07-326342, H10-255768, and H10-302770, descriptions are given of silicon alloys. Further, in Japanese Unexamined Patent Publication No. H04-12586, Japanese Unexamined Patent Application Publication Nos. H10-308207, S61-66369, S62-145650, H10-125317, H10-223221, S10-308207, and H11-86854, descriptions are given of tin-nickel alloy, lithium-aluminum-tin alloy, tin-zinc alloy, a tin alloy containing phosphorus (P) in the range from 1 wt % to 55 wt %, $Cu_2NiSn$, $Mg_2Sn$, tin-copper alloy, or a mixture of a tin containing phase inserting lithium and a phase not inserting lithium (Li) including manganese (Mn), iron (Fe), cobalt, nickel (Ni), or copper (Cu).

However, even in the cases using such alloy materials, it is a reality that sufficient cycle characteristics are not able to be obtained, and advantages of the high capacity anodes in the alloy materials are not sufficiently utilized.

Therefore, as an anode active material capable of sufficiently improving cycle characteristics, a material containing tin, cobalt, and carbon as an element has been developed. However, there is a shortcoming that when a battery is actually manufactured, battery characteristics are not able to be improved without optimizing the surface density ratio to the cathode active material layer.

SUMMARY

In view of the foregoing problems, in the present invention, it is desirable to provide a battery capable of providing a high energy density and superior cycle characteristics.

According to an embodiment of the present invention, there is provided a battery including a cathode having a cathode active material layer and an anode having an anode active material layer, in which the cathode active material layer contains a complex oxide containing lithium and cobalt as an element, the anode active material layer contains a CoSnC containing material containing tin, cobalt, and carbon as an element, in which the carbon content is from 16.8 wt % to 24.8 wt %, and the ratio of cobalt to the total of tin and cobalt is from 30 wt % to 45 wt %, and a surface density ratio of the cathode active material layer to the anode active material layer (surface density of the cathode active material layer/ surface density of the anode active material layer) is in the range from 2.77 to 3.90.

According to the battery of the embodiment of the present invention, the CoSnC containing material is used for the anode active material layer, and the surface density ratio between the cathode active material layer and the anode active material layer is in the given range. Therefore, a high energy density can be obtained, and superior cycle characteristics can be obtained.

Additional features and advantages are described herein, and will be apparent from, the following Detailed Description and the figures.

DETAILED DESCRIPTION

An embodiment of the present invention will be hereinafter described in detail with reference to the drawings.

Figure 1:
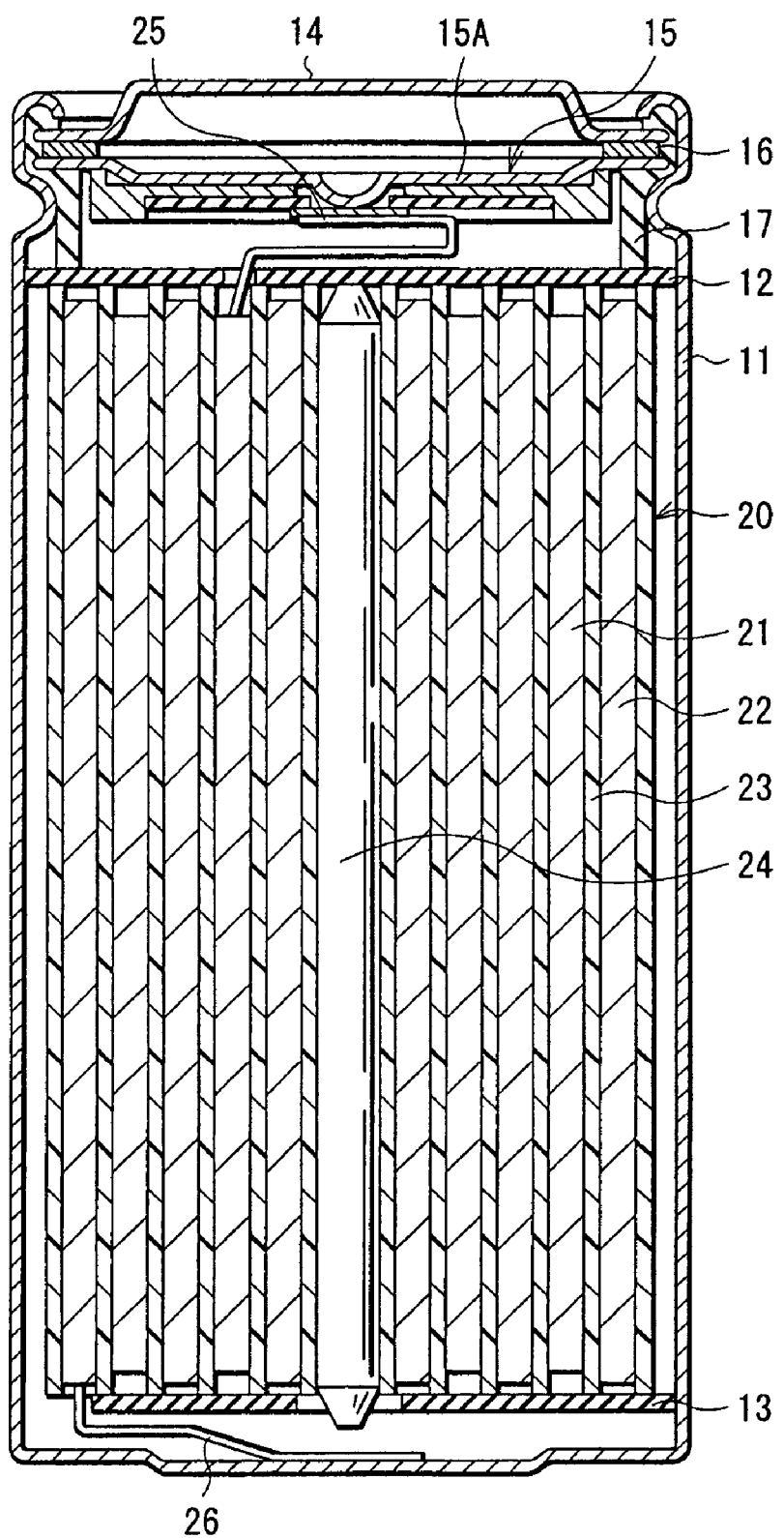
FIG. 1 is a cross section showing a structure of a secondary battery according to an embodiment of the present invention.

FIG. 1 shows a cross sectional structure of a secondary battery according to an embodiment of the present invention. The secondary battery is a so-called cylinder-type secondary battery having a spirally wound electrode body 20, in which a strip-shaped cathode 21 and a strip-shaped anode 22 are wound with a separator 23 inbetween inside a battery can 11 in the shape of an approximately hollow cylinder. The battery can 11 is made of, for example, iron plated by nickel. One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby hermetically sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
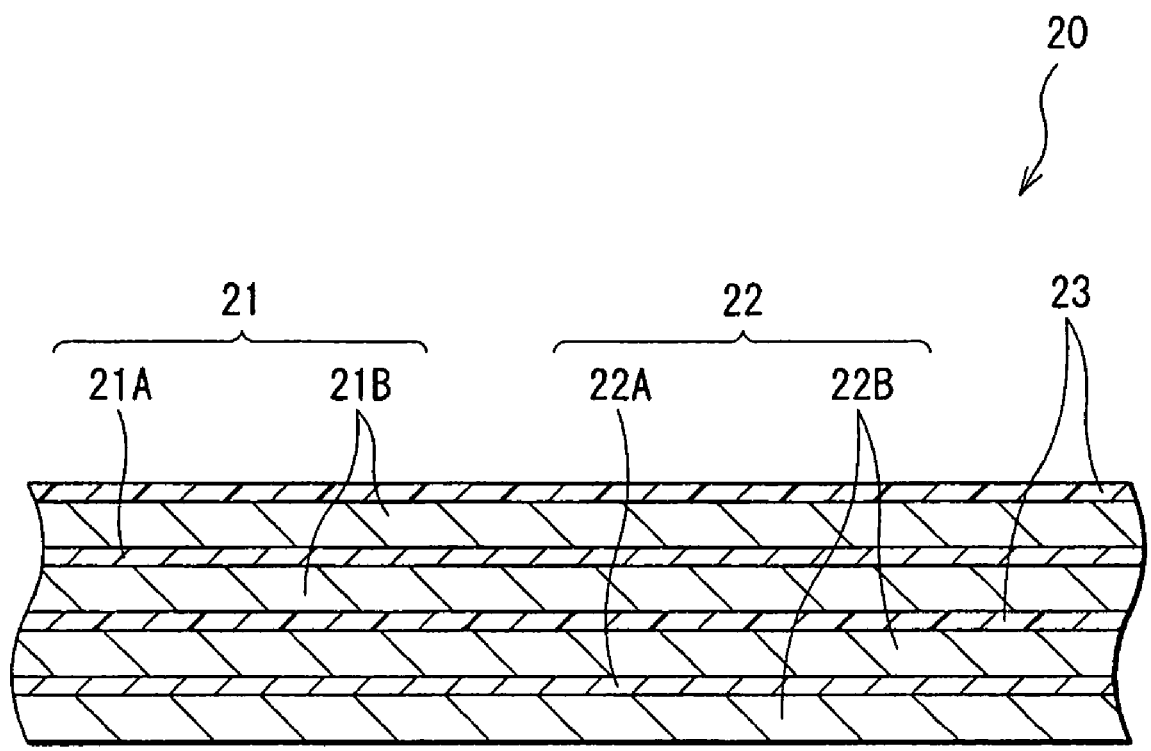
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on both faces of a cathode current collector 21A having a pair of opposed faces. The cathode current collector 21A is made of, for example, a metal foil such as an aluminum foil, a nickel foil, and a stainless foil.

The cathode active material layer 21B contains a complex oxide containing lithium and cobalt as an element as a cathode active material capable of inserting and extracting lithium in order to obtain a high voltage and a high energy density. As such a complex oxide, for example, lithium cobalt complex oxide ($LiCoO_2$), a lithium nickel cobalt complex oxide ($LiNi_{1-x}Co_xO_2$ (0<x<1)), a lithium nickel cobalt manganese complex oxide ($LiNi_{1-y-z}Co_yMn_zO_2$ (0<y, 0<z, y+z<1)) can be cited. A complex oxide containing elements other than nickel and manganese may be used. For the cathode active material layer 21B, such a complex oxide may be used singly, or two or more thereof may be used by mixing. Further, if necessary, the cathode active material layer 21B may contain other materials such as an electrical conductor and a binder.

The anode 22 has a structure, in which, for example, an anode active material layer 22B is provided on both faces of an anode current collector 22A having a pair of opposed faces. The anode current collector 22A is made of, for example, a metal foil such as a copper foil, a nickel foil, and a stainless foil.

The anode active material layer 22B contains, as an anode active material capable of inserting and extracting lithium, for example, a CoSnC containing material containing tin, cobalt, and carbon as an element, in which the carbon content is from 16.8 wt % to 24.8 wt %, and the ratio of cobalt to the total of tin and cobalt is from 30 wt % to 45 wt %. Thereby, a high energy density and superior cycle characteristics can be obtained. For the anode active material layer 22B, one CoSnC containing material may be used singly, or two or more thereof may be used by mixing.

The CoSnC containing material may further contain other elements if necessary. As other element, for example, silicon (Si), iron, nickel, chromium (Cr), indium (In), niobium (Nb), germanium (Ge), titanium (Ti), molybdenum (Mo), aluminum, phosphorus, gallium (Ga), or bismuth (Bi) is preferable. Two or more thereof may be contained, since the capacity or cycle characteristics can be thereby further improved.

The CoSnC containing material has a phase containing tin, cobalt, and carbon. The phase preferably has a structure with low crystallinity or an amorphous structure. Further, it is preferable that in the CoSnC containing material, at least part of carbon as the element is bonded with a metal element or a metalloid element as other element. This is because it is thinkable that lowered cycle characteristics are caused by cohesion or crystallization of tin or the like; however, such cohesion or crystallization can be inhibited by bonding carbon with other element.

As a measuring method for examining bonding state of elements, for example, X-ray Photoelectron Spectroscopy (XPS) can be cited. In XPS, in the case of graphite, the peak of 1s orbital of carbon (C1s) is shown in 284.5 eV in the apparatus, in which energy calibration is made so that the peak of 4f orbital of gold atom (Au4f) is obtained in 84.0 eV. In the case of surface contamination carbon, the peak is shown in 284.8 eV. Meanwhile, in the case of higher electric charge density of carbon element, for example, when carbon is bonded with a metal element or a metalloid element, the peak of C1s is shown in the region lower than 284.5 eV. That is, when the peak of the composite wave of C1s obtained for the CoSnC containing material is shown in the region lower than 284.5 eV, at least part of carbon contained in the CoSnC containing material is bonded with the metal element or the metalloid element, which are other element.

In XPS measurement, for example, the peak of C1s is used for correcting the energy axis of spectrums. Since surface contamination carbon generally exists on the surface, the peak of C1s of the surface contamination carbon is set to in 284.8 eV, which is used as an energy reference value. In XPS measurement, the waveform of the peak of C1s is obtained as a shape including the peak of the surface contamination carbon and the peak of carbon in the CoSnC containing material. Therefore, by performing analysis by using a commercially available software or the like, the peak of the surface contamination carbon and the peak of carbon in the CoSnC containing material are separated. In the analysis of the waveform, the position of the main peak existing on the lowest bound energy side is set to the energy reference value (284.8 eV).

The anode active material layer 22B may also contain other materials such as other anode active material, an electrical conductor, and a binder if necessary.

The surface density ratio of the cathode active material layer 21B to the anode active material layer 22B (surface density of the cathode active material layer/surface density of the anode active material layer) is within the range from 2.77 to 3.90, since a high energy density and superior cycle characteristics can be thereby obtained.

The separator 23 separates the cathode 21 from the anode 22, prevents current short circuit due to contact of both electrodes, and lets through lithium ions. The separator 23 is made of, for example, a synthetic resin porous film made of polytetrafluoroethylene, polypropylene, polyethylene or the like, or a ceramics porous film. The separator 23 may have a structure, in which two or more of the foregoing porous films are layered.

For example, an electrolytic solution as the liquid electrolyte is impregnated in the separator 23. The electrolytic solution contains, for example, a solvent and an electrolyte salt dissolved in the solvent.

As a solvent, for example, a nonaqueous solvent such as ethylene carbonate, propylene carbonate, dimethyl carbonate, diethyl carbonate, methyl ethyl carbonate, 1,2-dimethoxy ethane, 1,2-diethoxy ethane, γ-butyrolactone, γ-valerolactone, tetrahydrofuran, 2-methyl tetrahydrofuran, 1,3-dioxolane, 4-methyl-1,3-dioxolane, 1,3-dioxole-2-one, 4-vinyl-1, 3-dioxolane-2-one, 4-fluoro-1,3-dioxolane-2-one, diethyl ether, sulfolane, methyl sulfolane, acetonitrile, propionitrile, anisole, ester acetate, ester butyrate, ester propionate, fluoro benzene, and ethylene sulfite can be cited. The solvent may be used singly, or two or more thereof may be used by mixing.

As an electrolyte salt, for example, a lithium salt such as LiPF$_6$, LiBF$_4$, LiClO$_4$, LiAsF$_6$, LiN(CF$_3$SO$_2$)$_2$, LiN(C$_2$F$_5$SO$_2$)$_2$, LiC(CF$_3$SO$_2$)$_3$, LiB(C$_6$H$_5$)$_4$, LiB(C$_2$O$_4$)$_2$, LiCF$_3$SO$_3$, LiCH$_3$SO$_3$, LiCl, and LiBr can be cited. The electrolyte salt may be used singly, or two or more thereof may be used by mixing.

The secondary battery can be manufactured, for example, as follows.

First, for example, the cathode active material layer 21B is formed on the cathode current collector 21A to form the cathode 21. The cathode active material layer 21B is formed as follows, for example. A cathode mixture is prepared by mixing, for example, cathode active material powder, an electrical conductor, and a binder, and then dispersed in a solvent such as N-methyl-2-pyrrolidone to obtain a paste cathode mixture slurry. Next, the cathode mixture slurry is applied to the cathode current collector 21A, which is dried and compression-molded. Further, for example, as in the cathode 21, the anode active material layer 22B is formed on the anode current collector 22A to form the anode 22. At this time, the surface density ratio between the cathode active material layer 21B and the anode active material layer 22B is adjusted as described above.

Next, the cathode lead 25 is attached to the cathode current collector 21A by welding or the like, and the anode lead 26 is attached to the anode current collector 22A by welding or the like. Subsequently, the cathode 21 and the anode 22 are wound with the separator 23 inbetween. An end of the cathode lead 25 is welded to the safety valve mechanism 15, and an end of the anode lead 26 is welded to the battery can 11. The wound cathode 21 and the wound anode 22 are sandwiched between the pair of insulating plates 12 and 13, and accommodated inside the battery can 11. After the cathode 21 and the anode 22 are accommodated inside the battery can 11, the electrolytic solution is injected into the battery can 11, and impregnated in the separator 23. After that, at the open end of the battery can 11, the battery cover 14, the safety valve mechanism 15, and the PTC device 16 are fixed by being caulked through the gasket 17. The secondary battery shown in FIG. 1 is thereby completed.

As above, according to this embodiment, the CoSnC containing material is used as an anode active material, and the surface density ratio between the cathode active material layer 21B and the anode active material layer 22B is in the given range. Therefore, a high energy density can be obtained, and superior cycle characteristics can be improved.

EXAMPLES

Further, specific examples of the present invention will be described in detail.

Examples 1-1 to 1-7

The cylindrical secondary battery as shown in FIG. 1 was fabricated.

First, the CoSnC containing material powders were fabricated as follows. As raw materials, cobalt powders, tin powders, carbon powders were prepared. Cobalt powders and tin powders were alloyed to form cobalt·tin alloy powders, to which carbon powders were added and dry-blended. Next, the mixture and 400 g of a steel ball being 9 mm in diameter were set in the reaction vessel of a planetary ball mill of Ito Seisakusho. Subsequently, inside of the reaction vessel was substituted with the argon atmosphere. Then, 10-minute operation at 250 rpm and 10-minute interval were repeated until the total operation time reached 30 hours to synthesize the CoSnC containing material by utilizing mechanochemical reaction. After that, the reaction vessel was cooled down to room temperatures and the synthesized CoSnC containing material powders were taken out. Coarse grains were removed through a sieve having 280 meshes.

Figure 3:
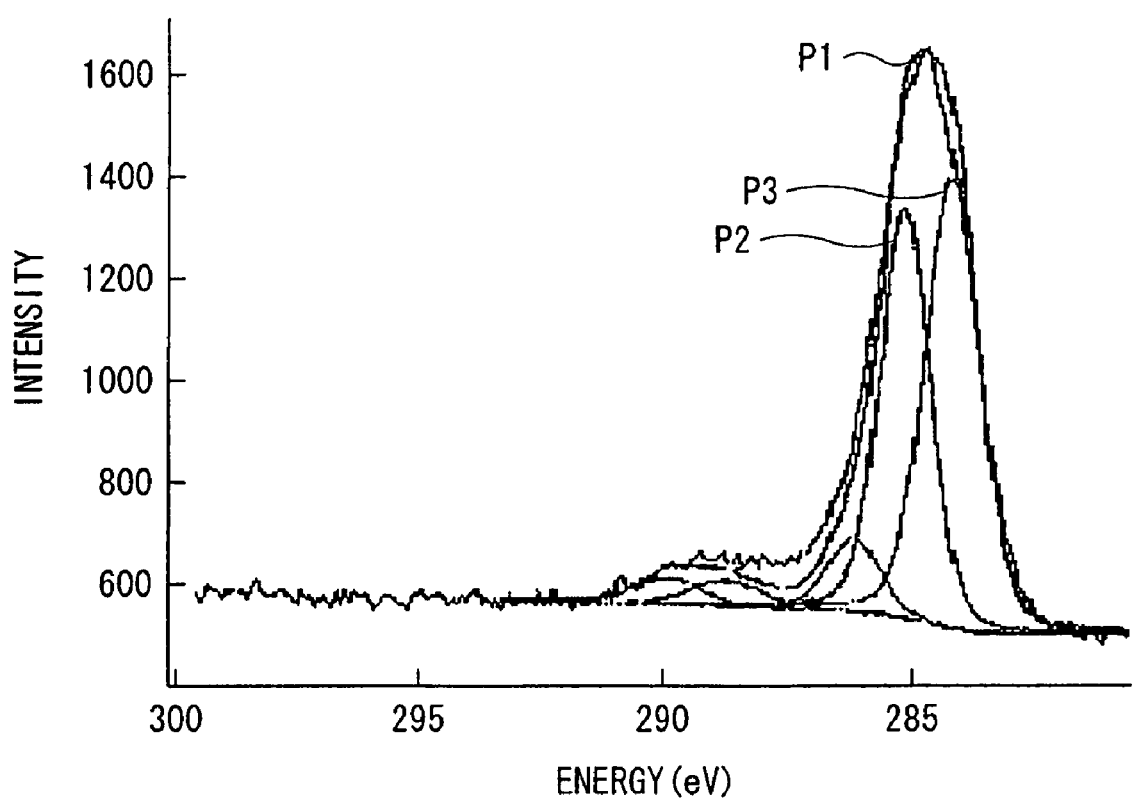
FIG. 3 is an example showing peaks obtained by X-ray photoelectron spectroscopy according to a CoSnC containing material formed in Examples.

Regarding the obtained CoSnC containing material, the composition was analyzed. The carbon content was measured by a carbon sulfur analyzer. The contents of cobalt and tin were measured by ICP (Inductively Coupled Plasma) optical emission spectroscopy. In the result, the cobalt content was 29.3 wt %, the tin content was 49.9 wt %, and the carbon content was 19.8 wt %. The ratio of cobalt to the total of tin and cobalt (hereinafter referred to as Co/(Sn+Co) ratio) was 37 wt %. Further, regarding the obtained CoSnC containing material, X-ray diffraction was performed. In the result, the diffraction peak having a wide half value width with the diffraction angle 2θ of 1.0 degree or more was observed in the range of diffraction angle 2θ=20 to 50 degrees. Further, when XPS was performed on the CoSnC containing material, as shown in FIG. 3, a peak P1 was obtained. When the peak P1 was analyzed, a peak P2 of surface contamination carbon and a peak P3 of C1s in the CoSnC containing material on the energy side lower than of the peak P2 were obtained. The peak P3 was obtained in the region lower than 284.5 eV. That is, it was confirmed that carbon in the CoSnC containing material was bonded with other element.

The CoSnC containing material; graphite as the electrical conductor and the anode active material; polyvinylidene fluoride as the binder; and carboxymethyl cellulose as the thickener were mixed at a weight ratio of CoSnC containing material:graphite:polyvinylidene fluoride:carboxymethyl cellulose=100:20:4:1 to prepare an anode mixture. The anode mixture was dispersed in water as the solvent to form an anode mixture slurry. Next, both faces of the anode current collector 22A made of a copper foil being 15 μm thick were coated with the anode mixture slurry, which was then dried. The resultant was compression-molded to form the strip-shaped anode 22 being 75 μm thick. Then, the surface density of the anode active material layer 22B was 16.5 g/cm$^2$ on both faces.

Further, lithium cobalt complex oxide (LiCoO$_2$) powders as a cathode active material; graphite as the electrical conductor; and polyvinylidene fluoride as the binder were mixed at a weight ratio of LiCoO$_2$:graphite:polyvinylidene fluoride=100:1:3 to prepare a cathode mixture. The cathode mixture was dispersed in N-methyl-2-pyrrolidone as the solvent to form a cathode mixture slurry. Subsequently, both faces of the cathode current collector 21A made of an aluminum foil being 15 μm thick were coated with the cathode mixture slurry, which was then dried. The resultant was compression-molded to form the cathode active material layer 21B and thereby the strip-shaped cathode 21 was formed. Then, the surface density of the cathode active material layer 21B was changed on both faces as shown in Table 1, and the surface density ratio of the cathode active material layer 21B to the anode active material layer 22B was changed.

TABLE 1

|  | Cathode surface density (g/cm²) | Anode surface density (g/cm²) | Surface density ratio | Initial discharge electric energy | | Discharge electric energy at the 100th cycle | | Discharge electric energy retention ratio | |
| --- | --- | --- | --- | --- | --- | --- | --- | --- | --- |
|  |  |  |  | (Wh) | Evaluation | (Wh) | Evaluation | (%) | Evaluation |
| Example 1-1 | 45.9 | 16.5 | 2.78 | 2.76 | Δ | 2.48 | ○ | 89.9 | ⊚ |
| Example 1-2 | 48.4 | 16.5 | 2.93 | 2.84 | ○ | 2.54 | ○ | 89.4 | ⊚ |
| Example 1-3 | 50.8 | 16.5 | 3.08 | 2.91 | ○ | 2.60 | ⊚ | 89.3 | ⊚ |
| Example 1-4 | 53.3 | 16.5 | 3.23 | 2.98 | ⊚ | 2.64 | ⊚ | 88.6 | ⊚ |
| Example 1-5 | 56.8 | 16.5 | 3.44 | 3.01 | ⊚ | 2.64 | ⊚ | 87.7 | ⊚ |
| Example 1-6 | 60.1 | 16.5 | 3.64 | 3.05 | ⊚ | 2.49 | ○ | 81.6 | ○ |
| Example 1-7 | 62.7 | 16.5 | 3.80 | 3.11 | ⊚ | 2.32 | Δ | 74.6 | ○ |

Anode active material: 29.3Co—49.9Sn—19.8CCo/(Sn + Co) = 37 wt %

The cathode 21 and the anode 22 were wound several times with the separator 23 made of a micro porous polyethylene film being 25 μm thick inbetween after layering the anode 22, the separator 23, the cathode 21, and the separator 23 in this order. Thereby, the spirally wound electrode body 20 was formed. Further, the spirally wound electrode body 20 was fixed by an unshown adhesive tape.

The spirally wound electrode body 20 was accommodated in the battery can 11 made of nickel-plated iron. Then, on the top and bottom faces of the spirally wound electrode body 20, the insulating plates 12 and 13 were provided. The cathode lead 25 made of aluminum was derived from the cathode current collector 21A and welded to the battery cover 14. Meanwhile, the anode lead 26 made of nickel was derived from the anode current collector 22A and welded to the battery can 11.

Subsequently, the electrolytic solution was injected in the battery can 11. For the electrolytic solution, the substance obtained by dissolving $LiPF_6$ as an electrolyte salt in a mixed solvent of ethylene carbonate, propylene carbonate, and dimethyl carbonate was used. After that, by caulking the battery can 11 through the gasket 17 with the surface coated with asphalt, the safety valve mechanism 15, the PTC device 16, and the battery cover 14 were fixed and the cylindrical secondary battery shown in FIG. 1 was fabricated.

Regarding the fabricated secondary batteries, the discharge electric energy and cycle characteristics were evaluated. The results are shown in Table 1. Then, the electric energy and cycle characteristics were measured as follows.

First, after constant current and constant voltage charge at a current value of 0.9 A and at the upper limit voltage of 4.2 V was performed for 3 hours, charge and discharge were repeated at an electric power of 0.5 W until the battery voltage reached 2.5 V. For the electric energy, the initial discharge electric energy and the discharge electric energy at the 100th cycle were obtained. Further, for the cycle characteristics, the discharge electric energy retention ratio at the 100th cycle to the initial discharge electric energy was obtained.

Further, the electric energy and cycle characteristics were evaluated as follows. The initial electric energy was evaluated as ⊚ for 2.92 Wh or more, ○ for 2.79 Wh or more but less than 2.92 Wh, Δ for 2.75 Wh or more but less than 2.79 Wh, and X for less than 2.75 Wh. The discharge electric energy at the 100th cycle was evaluated as ⊚ for 2.59 Wh or more, ○ for 2.46 Wh or more but less than 2.59 Wh, and Δ for less than 2.46 Wh. The discharge electric energy retention ratio was evaluated as ⊚ for 85% or more, ○ for 72% or more but less than 85%, and Δ for less than 72%. The sample, in which the number of X was 0 and the number of Δ was 1 or less in all evaluation items was evaluated as a fair quality.

As evidenced by Table 1, according to Examples 1-1 to 1-7, in which the surface density ratio is from 2.77 to 3.90, high values were obtained for the discharge electric energy and the electric energy retention ratio.

That is, it was found that when the surface density ratio of the cathode active material layer 21B to the anode active material layer 22B was from 2.77 to 3.90, the electric energy and cycle characteristics could be improved.

Examples 2-1 to 2-6

The CoSnC containing material and secondary batteries were fabricated as in Examples 1-1 to 1-7, except that the raw material ratio of the carbon powders was changed. Then, the surface density of the anode active material layer 22B was 16.9 g/cm² on both faces, the surface density of the cathode active material layer 21B was changed on both faces as shown in Table 2, and the surface density ratio of the cathode active material layer 21B to the anode active material layer 22B was changed.

TABLE 2

|  | Cathode surface density (g/cm²) | Anode surface density (g/cm²) | Surface density ratio | Initial discharge electric energy | | Discharge electric energy at the 100th cycle | | Discharge electric energy retention ratio | |
| --- | --- | --- | --- | --- | --- | --- | --- | --- | --- |
|  |  |  |  | (Wh) | Evaluation | (Wh) | Evaluation | (%) | Evaluation |
| Example 2-1 | 49.1 | 16.9 | 2.91 | 2.86 | ○ | 2.51 | ○ | 87.8 | ⊚ |
| Example 2-2 | 51.5 | 16.9 | 3.05 | 2.93 | ⊚ | 2.57 | ○ | 87.7 | ⊚ |
| Example 2-3 | 54.0 | 16.9 | 3.20 | 3.00 | ⊚ | 2.61 | ⊚ | 87.0 | ⊚ |
| Example 2-4 | 57.6 | 16.9 | 3.41 | 3.03 | ⊚ | 2.61 | ⊚ | 86.1 | ⊚ |
| Example 2-5 | 60.9 | 16.9 | 3.61 | 3.07 | ⊚ | 2.46 | ○ | 80.1 | ○ |
| Example 2-6 | 63.5 | 16.9 | 3.76 | 3.12 | ⊚ | 2.28 | Δ | 73.1 | ○ |

TABLE 2-continued

| | Cathode surface density (g/cm²) | Anode surface density (g/cm²) | Surface density ratio | Initial discharge electric energy (Wh) | | Discharge electric energy at the 100th cycle (Wh) | | Discharge electric energy retention ratio (%) | |
|---|---|---|---|---|---|---|---|---|---|
| | | | | | Evaluation | | Evaluation | | Evaluation |
| Comparative example 2-1 | 46.5 | 16.9 | 2.76 | 2.78 | Δ | 2.45 | Δ | 88.1 | ⊚ |

Anode active material: 30.4Co—51.8Sn—16.8C

As Comparative example 2-1 relative to Examples 2-1 to 2-6, a secondary battery was fabricated as in Examples 2-1 to 2-6, except that the surface density of the cathode active material layer 21B was 46.5 g/cm² on both faces and the surface density ratio of the cathode active material layer 21B to the anode active material layer 22B was 2.76.

Regarding the obtained CoSnC containing material, the composition was analyzed as in Examples 1-1 to 1-7. The cobalt content was 30.4 wt %, the tin content was 51.8 wt %, and the carbon content was 16.8 wt %. The Co/(Sn+Co) ratio was 37 wt %. Further, XPS was performed, and the obtained peaks were analyzed. In the result, as in Examples 1-1 to 1-7, the peak P2 of the surface contamination carbon and the peak P3 of C1s in the anode active material were obtained. The peak P3 was obtained in the region lower than 284.5 eV for all examples. That is, it was confirmed that at least part of carbon contained in the anode active material was bonded with other element. Further, regarding the secondary batteries, as in Examples 1-1 to 1-7, the electric energy and cycle characteristics were measured. The results are shown in Table 2.

As evidenced by Table 2, according to Examples 2-1 to 2-6, in which the surface density ratio was from 2.77 to 3.90, better values were obtained than in Comparative example 2-1, in which the surface density ratio was out of the foregoing range for both the discharge electric energy and the electric energy retention ratio.

In other words, it was found that also in the case that the carbon content in the CoSnC containing material was 16.8 wt %, the electric energy and cycle characteristics could be improved as long as the surface density ratio of the cathode active material layer 21B to the anode active material layer 22B was from 2.77 to 3.90.

Examples 3-1 to 3-7

The CoSnC containing material and secondary batteries were fabricated as in Examples 1-1 to 1-7, except that the raw material ratio of the carbon powders was changed. Then, the surface density of the anode active material layer 22B was 16.6 g/cm² on both faces, the surface density of the cathode active material layer 21B was changed on both faces as shown in Table 3, and the surface density ratio of the cathode active material layer 21B to the anode active material layer 22B was changed.

TABLE 3

| | Cathode surface density (g/cm²) | Anode surface density (g/cm²) | Surface density ratio | Initial discharge electric energy (Wh) | | Discharge electric energy at the 100th cycle (Wh) | | Discharge electric energy retention ratio (%) | |
|---|---|---|---|---|---|---|---|---|---|
| | | | | | Evaluation | | Evaluation | | Evaluation |
| Example 3-1 | 46.2 | 16.6 | 2.79 | 2.77 | Δ | 2.46 | ○ | 88.8 | ⊚ |
| Example 3-2 | 48.7 | 16.6 | 2.94 | 2.85 | ○ | 2.53 | ○ | 88.8 | ⊚ |
| Example 3-3 | 51.1 | 16.6 | 3.09 | 2.92 | ⊚ | 2.58 | ○ | 88.4 | ⊚ |
| Example 3-4 | 53.6 | 16.6 | 3.24 | 2.98 | ⊚ | 2.62 | ⊚ | 87.9 | ⊚ |
| Example 3-5 | 57.2 | 16.6 | 3.45 | 3.02 | ⊚ | 2.62 | ⊚ | 86.8 | ⊚ |
| Example 3-6 | 60.4 | 16.6 | 3.65 | 3.06 | ⊚ | 2.47 | ○ | 80.7 | ○ |
| Example 3-7 | 63.0 | 16.6 | 3.81 | 3.11 | ⊚ | 2.30 | Δ | 74.0 | ○ |

Anode active material: 27.5Co—46.8Sn—24.8C

Regarding the obtained CoSnC containing material, the composition was analyzed as in Examples 1-1 to 1-7. The cobalt content was 27.5 wt %, the tin content was 46.8 wt %, and the carbon content was 24.8 wt %. The Co/(Sn+Co) ratio was 37 wt %. Further, XPS was performed, and the obtained peaks were analyzed. In the result, as in Examples 1-1 to 1-7, the peak P2 of the surface contamination carbon and the peak P3 of C1s in the anode active material were obtained. The peak P3 was obtained in the region lower than 284.5 eV for all examples. That is, it was confirmed that at least part of carbon contained in the anode active material was bonded with other element. Further, regarding the secondary batteries, as in Examples 1-1 to 1-7, the electric energy and cycle characteristics were measured. The results are shown in Table 3.

As evidenced by Table 3, the results similar to of Examples 1-1 to 1-7 were obtained. That is, it was found that also in the case that the carbon content in the CoSnC containing material was 24.8 wt %, the electric energy and cycle characteristics could be improved as long as the surface density ratio of the cathode active material layer 21B to the anode active material layer 22B was from 2.77 to 3.90.

Examples 4-1 to 4-6

The CoSnC containing material and secondary batteries were fabricated as in Examples 1-1 to 1-7, except that the Co/(Sn+Co) ratio was 30 wt %. Then, the surface density of the anode active material layer 22B was 16.9 g/cm² on both faces, the surface density of the cathode active material layer 21B was changed on both faces as shown in Table 4, and the surface density ratio of the cathode active material layer 21B to the anode active material layer 22B was changed.

active material was bonded with other element. Further, regarding the secondary batteries, as in Examples 1-1 to 1-7, the electric energy and cycle characteristics were measured. The results are shown in Table 4.

As evidenced by Table 4, according to Examples 4-1 to 4-6, in which the surface density ratio was from 2.77 to 3.90, better values were obtained than in Comparative example 4-1, in which the surface density ratio was out of the foregoing range for both the discharge electric energy and the electric energy retention ratio.

That is, it was found that also in the case that the Co/(Sn+Co) ratio in the CoSnC containing material was 30 wt %, the

TABLE 4

|  | Cathode surface density (g/cm²) | Anode surface density (g/cm²) | Surface density ratio | Initial discharge electric energy (Wh) | | Discharge electric energy at the 100th cycle (Wh) | | Discharge electric energy retention ratio (%) | |
|---|---|---|---|---|---|---|---|---|---|
|  |  |  |  | (Wh) | Evaluation | (Wh) | Evaluation | (%) | Evaluation |
| Example 4-1 | 50.1 | 16.9 | 2.97 | 2.89 | ○ | 2.48 | ○ | 85.8 | ◉ |
| Example 4-2 | 52.8 | 16.9 | 3.13 | 2.96 | ◉ | 2.54 | ○ | 85.8 | ◉ |
| Example 4-3 | 55.5 | 16.9 | 3.29 | 3.03 | ◉ | 2.59 | ◉ | 85.5 | ◉ |
| Example 4-4 | 58.1 | 16.9 | 3.45 | 3.10 | ◉ | 2.63 | ◉ | 84.8 | ○ |
| Example 4-5 | 62.0 | 16.9 | 3.68 | 3.13 | ◉ | 2.62 | ◉ | 83.7 | ○ |
| Example 4-6 | 65.6 | 16.9 | 3.89 | 3.17 | ◉ | 2.46 | ◉ | 77.6 | ○ |
| Comparative example 4-1 | 68.3 | 16.9 | 4.05 | 3.22 | ◉ | 2.28 | Δ | 70.8 | Δ |

Anode active material: 23.8Co—55.4Sn—19.8C Co/(Sn + Co) = 30 wt %

As Comparative example 4-1 relative to Examples 4-1 to 4-6, a secondary battery was fabricated as in Examples 4-1 to 4-6, except that the surface density of the cathode active material layer 21B was 68.3 g/cm² on both faces and the surface density ratio of the cathode active material layer 21B to the anode active material layer 22B was 4.05.

Regarding the obtained CoSnC containing material, the composition was analyzed as in Examples 1-1 to 1-7. The cobalt content was 23.8 wt %, the tin content was 55.4 wt %, and the carbon content was 19.8 wt %. Further, XPS was performed, and the obtained peaks were analyzed. In the result, as in Examples 1-1 to 1-7, the peak P2 of the surface contamination carbon and the peak P3 of C1s in the anode active material were obtained. The peak P3 was obtained in the region lower than 284.5 eV for all examples. That is, it was confirmed that at least part of carbon contained in the anode electric energy and cycle characteristics could be improved as long as the surface density ratio of the cathode active material layer 21B to the anode active material layer 22B was from 2.77 to 3.90.

Examples 5-1 to 5-5

The CoSnC containing material and secondary batteries were fabricated as in Examples 1-1 to 1-7, except that the Co/(Sn+Co) ratio was 45 wt %. Then, the surface density of the anode active material layer 22B was 16.5 g/cm² on both faces, the surface density of the cathode active material layer 21B was changed on both faces as shown in Table 5, and the surface density ratio of the cathode active material layer 21B to the anode active material layer 22B was changed.

TABLE 5

|  | Cathode surface density (g/cm²) | Anode surface density (g/cm²) | Surface density ratio | Initial discharge electric energy | | Discharge electric energy at the 100th cycle | | Discharge electric energy retention ratio | |
|---|---|---|---|---|---|---|---|---|---|
|  |  |  |  | (Wh) | Evaluation | (Wh) | Evaluation | (%) | Evaluation |
| Example 5-1 | 46.4 | 16.5 | 2.81 | 2.78 | Δ | 2.54 | ○ | 91.4 | ◉ |
| Example 5-2 | 48.7 | 16.5 | 2.95 | 2.85 | ○ | 2.59 | ◉ | 90.9 | ◉ |
| Example 5-3 | 51.9 | 16.5 | 3.15 | 2.88 | ○ | 2.59 | ◉ | 98.9 | ◉ |
| Example 5-4 | 54.9 | 16.5 | 3.33 | 2.92 | ◉ | 2.45 | Δ | 83.9 | ○ |
| Example 5-5 | 57.2 | 16.5 | 3.47 | 2.98 | ◉ | 2.29 | Δ | 76.8 | ○ |
| Comparative example 5-1 | 44.2 | 16.5 | 2.68 | 2.71 | X | 2.48 | ○ | 91.5 | ◉ |
| Comparative example 5-2 | 42.0 | 16.5 | 2.54 | 2.63 | X | 2.42 | Δ | 92.0 | ◉ |

Anode active material: 35.6Co—43.6Sn—19.8C Co/(Sn + Co) = 45 wt %

As Comparative examples 5-1 and 5-2 relative to Examples 5-1 to 5-5, secondary batteries were fabricated as in Examples 5-1 to 5-5, except that the surface density of the cathode active material layer 21B was 44.2 g/cm$^2$ on both faces or 44.0 g/cm$^2$ on both faces, and the surface density ratio of the cathode active material layer 21B to the anode active material layer 22B was 2.71 or 2.63.

Regarding the obtained CoSnC containing material, the composition was analyzed as in Examples 1-1 to 1-7. The cobalt content was 35.6 wt %, the tin content was 43.6 wt %, and the carbon content was 19.8 wt %. Further, XPS was performed, and the obtained peaks were analyzed. In the result, as in Examples 1-1 to 1-7, the peak P2 of the surface contamination carbon and the peak P3 of C1s in the anode active material were obtained. The peak P3 was obtained in the region lower than 284.5 eV for all examples. That is, it was confirmed that at least part of carbon contained in the anode active material was bonded with other element. Further, regarding the secondary batteries, as in Examples 1-1 to 1-7, the electric energy and cycle characteristics were measured. The results are shown in Table 5.

As evidenced by Table 5, according to Examples 5-1 to 5-5, in which the surface density ratio was from 2.77 to 3.90, better values were obtained than in Comparative examples 5-1 and 5-2, in which the surface density ratio was out of the foregoing range for both the discharge electric energy and the electric energy retention ratio.

That is, it was found that also in the case that the Co/(Sn+Co) ratio in the CoSnC containing material was 45 wt %, the electric energy and cycle characteristics could be improved as long as the surface density ratio of the cathode active material layer 21B to the anode active material layer 22B was from 2.77 to 3.90.

Examples 6-1 to 6-7

The CoSnC containing material and secondary batteries were fabricated as in Examples 1-1 to 1-7, except that the indium powders were added as a raw material. Then, the CoSnC containing material was synthesized by forming cobalt-tin alloy powders by alloying cobalt powders and tin powders, to which carbon powders and indium powders were mixed. Further, the surface density of the anode active material layer 22B was 17.1 g/cm$^2$ on both faces, the surface density of the cathode active material layer 21B was changed on both faces as shown in Table 6, and the surface density ratio of the cathode active material layer 21B to the anode active material layer 22B was changed.

Regarding the obtained CoSnC containing material, the composition was analyzed as in Examples 1-1 to 1-7. The cobalt content was 27.4 wt %, the tin content was 50.8 wt %, and the carbon content was 17.8 wt %, and the indium content was 3.0 wt %. The indium content was measured by ICP optical emission spectroscopy. The Co/(Sn+Co) ratio was 35 wt %. Further, XPS was performed, and the obtained peaks were analyzed. In the result, as in Examples 1-1 to 1-7, the peak P2 of the surface contamination carbon and the peak P3 of C1s in the anode active material were obtained. The peak P3 was obtained in the region lower than 284.5 eV for all examples. That is, it was confirmed that at least part of carbon contained in the anode active material was bonded with other element. Further, regarding the secondary batteries, as in Examples 1-1 to 1-7, the electric energy and cycle characteristics were measured. The results are shown in Table 6.

As evidenced by Table 6, according to Examples 6-1 to 6-7, in which the surface density ratio was from 2.77 to 3.90, good values were obtained for both the discharge electric energy and the electric energy retention ratio.

That is, it was found that also in the case that at least one from the group consisting of silicon, iron, nickel, chromium, indium, niobium, germanium, titanium, molybdenum, aluminum, phosphorus, gallium, and bismuth was contained, the electric energy and cycle characteristics could be improved as long as the surface density ratio of the cathode active material layer 21B to the anode active material layer 22B was from 2.77 to 3.90.

Examples 7-1 to 7-7

Secondary batteries were fabricated as in Examples 1-1 to 1-7, except that LiCoO$_2$ and LiNi$_{0.5}$Co$_{0.2}$Mn$_{0.3}$O$_2$ were used as a cathode active material, and a material containing indium was used as the CoSnC material. Then, for LiCoO$_2$ and LiNi$_{0.5}$Co$_{0.2}$Mn$_{0.3}$O$_2$, a mixture obtained at a weight ratio of LiCoO$_2$:LiNi$_{0.5}$Co$_{0.2}$Mn$_{0.3}$O$_2$=80:20 was used. Further, for the CoSnC containing material, the material similar to of Examples 6-1 to 6-7 was used. Further, the surface density of the anode active material layer 22B was 17.1 g/cm$^2$ on both faces, the surface density of the cathode active material layer 21B was changed on both faces as shown in Table 7, and the surface density ratio of the cathode active material layer 21B to the anode active material layer 22B was changed.

TABLE 6

|  | Cathode surface density (g/cm$^2$) | Anode surface density (g/cm$^2$) | Surface density ratio | Initial discharge electric energy (Wh) | | Discharge electric energy at the 100th cycle (Wh) | | Discharge electric energy retention ratio (%) | |
|---|---|---|---|---|---|---|---|---|---|
|  |  |  |  | (Wh) | Evaluation | (Wh) | Evaluation | (%) | Evaluation |
| Example 6-1 | 48.9 | 17.1 | 2.86 | 2.85 | ○ | 2.70 | ◎ | 94.7 | ◎ |
| Example 6-2 | 51.5 | 17.1 | 3.02 | 2.93 | ◎ | 2.77 | ◎ | 94.5 | ◎ |
| Example 6-3 | 54.2 | 17.1 | 3.17 | 3.00 | ◎ | 2.82 | ◎ | 94.0 | ◎ |
| Example 6-4 | 56.8 | 17.1 | 3.32 | 3.07 | ◎ | 2.87 | ◎ | 93.5 | ◎ |
| Example 6-5 | 60.6 | 17.1 | 3.54 | 3.10 | ◎ | 2.87 | ◎ | 92.6 | ◎ |
| Example 6-6 | 64.1 | 17.1 | 3.75 | 3.14 | ◎ | 2.72 | ◎ | 86.6 | ◎ |
| Example 6-7 | 66.8 | 17.1 | 3.90 | 3.19 | ◎ | 2.54 | ○ | 79.6 | ○ |

Cathode active material: LiCoO$_2$
Anode active material: 27.4Co—50.8Sn—17.8C—3.0InCo/(Sn + Co) = 35 wt %

TABLE 7

|  | Cathode surface density (g/cm$^2$) | Anode surface density (g/cm$^2$) | Surface density ratio | Initial discharge electric energy (Wh) | | Discharge electric energy at the 100th cycle (Wh) | | Discharge electric energy retention ratio (%) | |
|---|---|---|---|---|---|---|---|---|---|
|  |  |  |  | (Wh) | Evaluation | (Wh) | Evaluation | (%) | Evaluation |
| Example 7-1 | 47.4 | 17.1 | 2.77 | 2.89 | ○ | 2.73 | ⊚ | 94.5 | ⊚ |
| Example 7-2 | 50.0 | 17.1 | 2.92 | 2.96 | ⊚ | 2.80 | ⊚ | 94.6 | ⊚ |
| Example 7-3 | 52.5 | 17.1 | 3.07 | 3.04 | ⊚ | 2.86 | ⊚ | 94.1 | ⊚ |
| Example 7-4 | 55.0 | 17.1 | 3.22 | 3.11 | ⊚ | 2.91 | ⊚ | 93.6 | ⊚ |
| Example 7-5 | 58.6 | 17.1 | 3.43 | 3.14 | ⊚ | 2.91 | ⊚ | 92.7 | ⊚ |
| Example 7-6 | 62.0 | 17.1 | 3.63 | 3.18 | ⊚ | 2.75 | ⊚ | 86.5 | ⊚ |
| Example 7-7 | 64.6 | 17.1 | 3.78 | 3.24 | ⊚ | 2.58 | ○ | 79.6 | ○ |

Cathode active material: $LiCoO_2 + LiNi_{0.5}Co_{0.2}Mn_{0.3}O_2$
Anode active material: 27.4Co—50.8Sn—17.8C—3.0InCo/(Sn + Co) = 35 wt %

Regarding the obtained secondary battery, the electric energy and cycle characteristics were measured as in Examples 1-1 to 1-7. The results are shown in Table 7.

As evidenced by Table 7, according to Examples 7-1 to 7-7, in which $LiCoO_2$ and $LiNi_{0.5}Co_{0.2}Mn_{0.3}O_2$ were used as a cathode active material and the surface density ratio was from 2.77 to 3.90, good values were obtained for both the discharge electric energy and the electric energy retention ratio.

That is, it was found that when the complex oxide containing lithium and cobalt as an element was used for the cathode active material, and the surface density ratio of the cathode active material layer 21B to the anode active material layer 22B was from 2.77 to 3.90, the electric energy and cycle characteristics could be improved.

The present invention has been described with reference to the embodiment and the examples. However, the present invention is not limited to the embodiment and the examples, and various modifications may be made. For example, in the foregoing embodiment and examples, descriptions have been given with reference to the cylindrical secondary battery having the winding structure. However, the present invention can be similarly applied to a secondary battery having other shape and using an package member such as a coin-type battery, a sheet-type battery, a button-type battery, and a square-type battery, or a secondary battery having a laminated structure, in which a cathode and an anode are layered a plurality of times.

Further, in the foregoing embodiment and examples, descriptions have been given of the case using the electrolytic solution. However, instead of the electrolytic solution, a gelatinous electrolyte or a solid electrolyte may be used. The gelatinous electrolyte is the electrolyte, in which, for example, an electrolytic solution is held in a high molecular weight compound. The electrolytic solution is as described above. Any high molecular weight compound may be used as long as the high molecular weight compound absorbs and gelates the electrolytic solution. As such a high molecular weight compound, for example, a fluorinated high molecular weight compound such as polyvinylidene fluoride and a copolymer of polyvinylidene fluoride and hexafluoro propylene; an ether high molecular weight compound such as polyethylene oxide and a cross-linked body containing polyethylene oxide; or polyacrylonitrile can be cited. In particular, in view of redox stability, the fluorinated high molecular weight compound is desirable.

As a solid electrolyte, for example, any inorganic solid electrolyte or any high molecular weight solid electrolyte can be used as long as such an electrolyte is a material having lithium ion conductivity. As an inorganic solid electrolyte, an electrolyte containing lithium nitride or lithium iodide can be cited. The high molecular weight solid electrolyte is mainly made of an electrolyte salt and a high molecular weight compound dissolving the electrolyte salt. As a high molecular weight compound of the high molecular weight solid electrolyte, for example, an ether high molecular weight compound such as polyethylene oxide and a cross-linked body containing polyethylene oxide; an ester high molecular weight compound such as polymethacrylate; and an acrylate high molecular weight compound can be used singly, or by mixing them, or by copolymerizing them. When such a solid electrolyte is used, the separator may be removed.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
a cathode having a cathode active material layer; and
an anode having an anode active material layer,
wherein the cathode active material layer contains a complex oxide containing lithium and cobalt,
the anode active material layer contains a material containing tin, cobalt, and carbon, in which the carbon content is from about 16.8 wt % to about 24.8 wt %, and ratio of cobalt to a total of tin and cobalt is from about 30 wt % to about 45 wt %, and a half value width of a diffraction peak obtained by X-ray diffraction of the anode active material is about 1° or more, and
a surface density ratio of the cathode active material layer to the anode active material layer from about 2.77 to about 3.90.

2. The battery of claim 1, wherein the material containing tin, cobalt and carbon further contains an element selected from the group consisting of silicon, iron, nickel, chromium, indium, niobium, germanium, titanium, molybdenum, aluminum, phosphorous, gallium and bismuth.

3. The battery of claim 1, wherein the carbon in the material containing tin, cobalt and carbon is bonded with a metal element or a metalloid element.

4. The battery of claim 1, wherein for the material containing tin, cobalt and carbon, a peak of C1s obtained using X-ray Photoelectron Spectroscopy is lower than 284.5 eV.

* * * * *